(No Model.)  
3 Sheets—Sheet 1.
R. H. CROSBY.
PROPELLING MECHANISM.
No. 552,576.  
Patented Jan. 7, 1896.
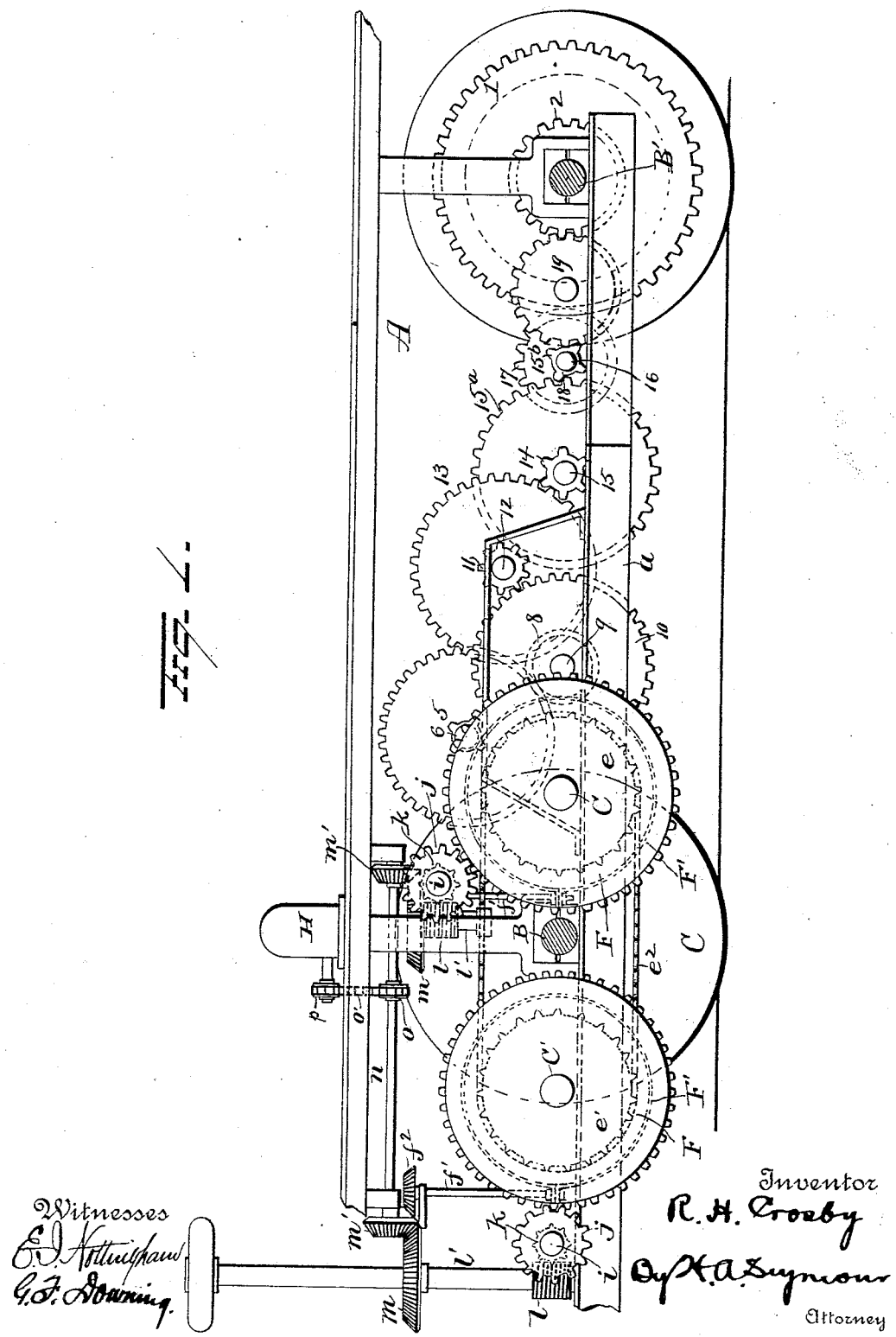
Witnesses  
Inventor  
R. H. Crosby  
Attorney

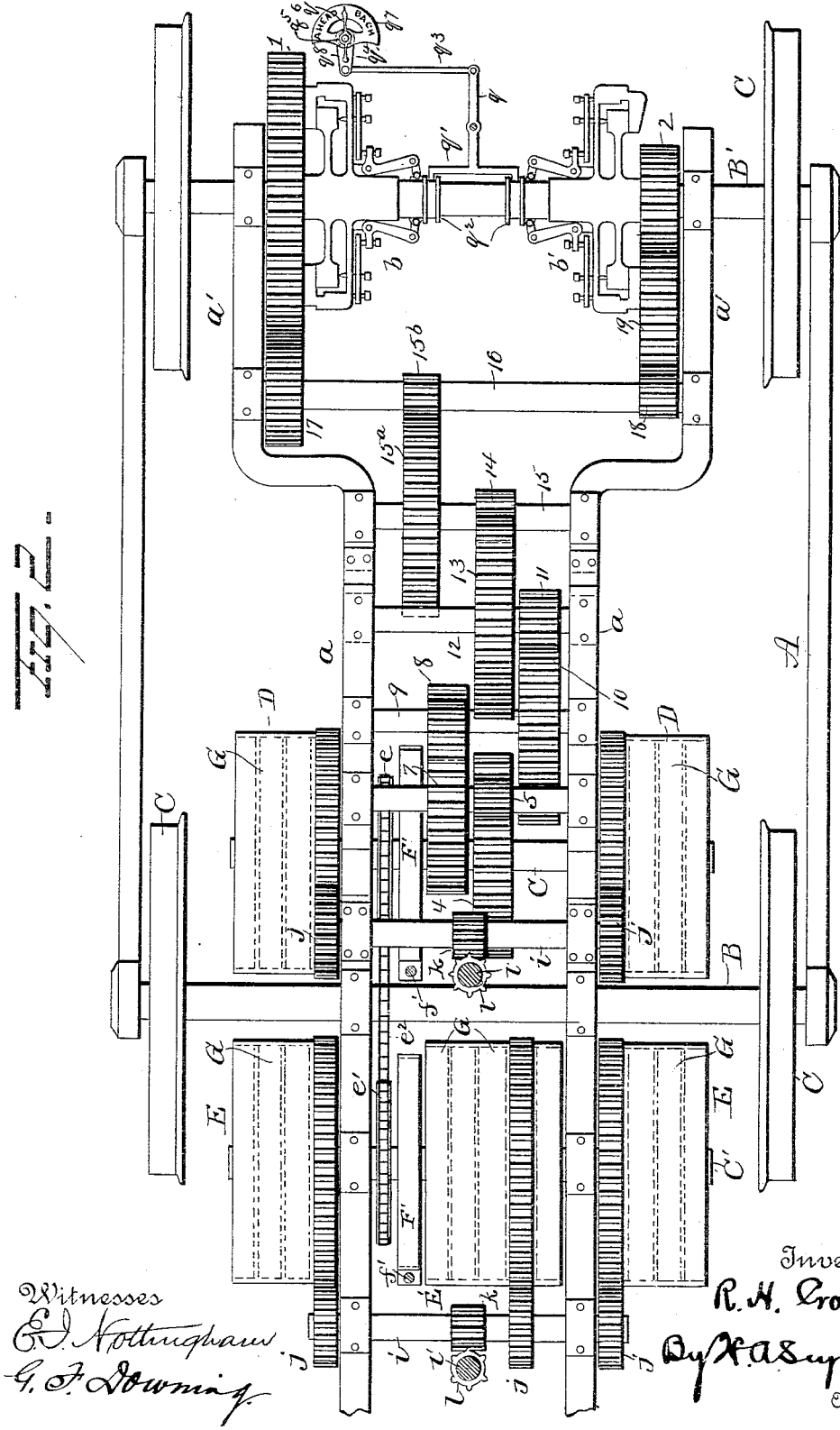

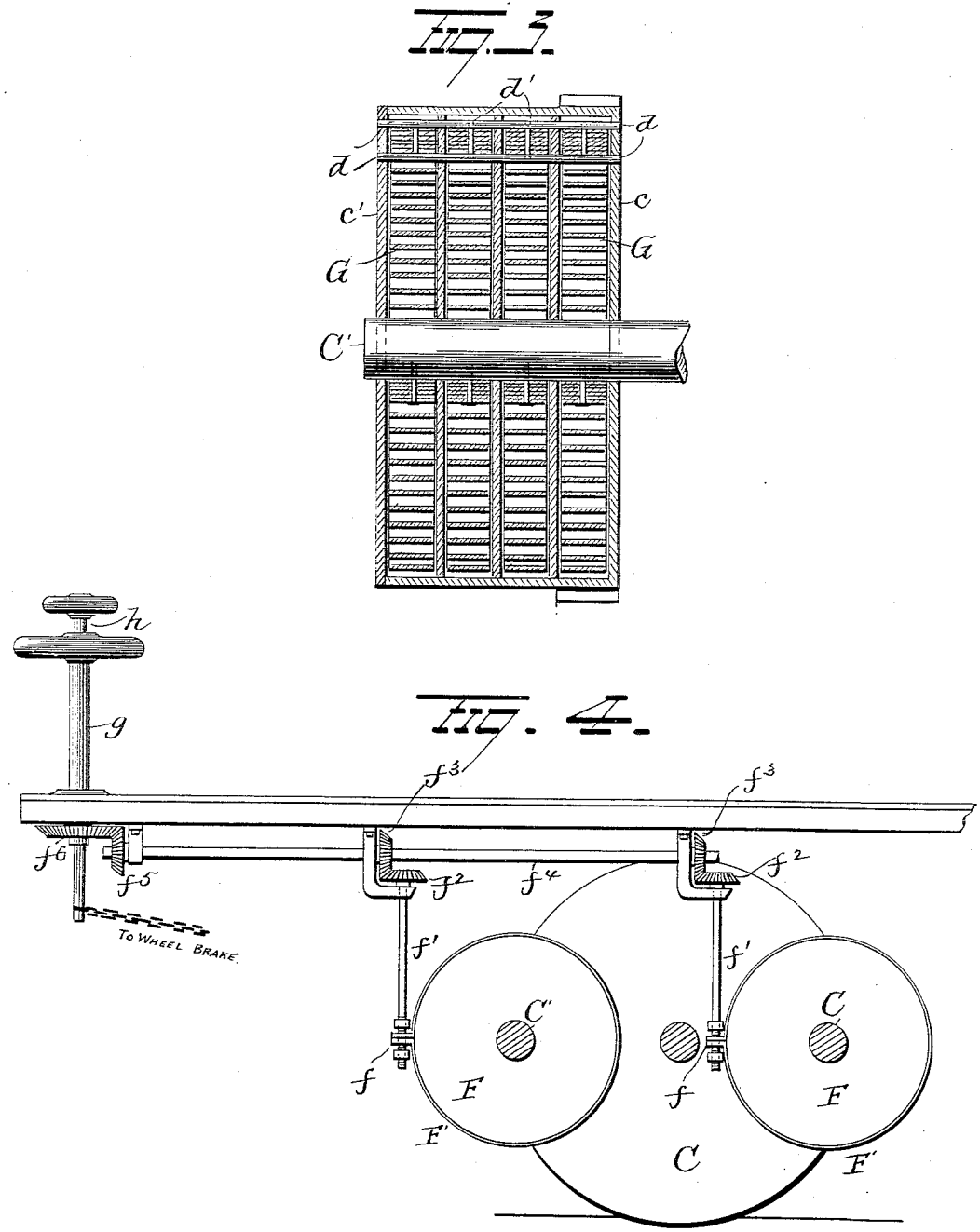

UNITED STATES PATENT OFFICE.

ROBERT H. CROSBY, OF WILLIAMSPORT, PENNSYLVANIA, ASSIGNOR OF TWO-THIRDS TO CHARLES F. W. FLOCK AND HARRY K. SMITH, OF SAME PLACE.

PROPELLING MECHANISM.

SPECIFICATION forming part of Letters Patent No. 552,576, dated January 7, 1896.

Application filed August 17, 1894. Serial No. 520,627. (No model.)

*To all whom it may concern:*

Be it known that I, ROBERT H. CROSBY, a resident of Williamsport, in the county of Lycoming and State of Pennsylvania, have invented certain new and useful Improvements in Propelling Mechanism; and I do hereby declare the following to be a full, clear, and exact description of the invention, such as will enable others skilled in the art to which it appertains to make and use the same.

My invention relates to an improvement in propelling mechanism for street-cars, watercraft, and other vehicles and engines, the object of the invention being to produce simple and efficient means for propelling a vehicle or engine, and to avoid the danger, inconvenience, and objection incident to electrical trolley or underground systems and cable roads.

A further object is to produce a compact spring-actuated propelling mechanism, by means of which an adequate amount of power can be stored and exerted for propelling a street-car or other vehicle.

A further object is to provide a spring-actuated propelling mechanism with devices whereby the car or other vehicle can be stopped by stopping or braking the propelling mechanism.

A further object is to provide simple and efficient means for easily and quickly winding the springs of a spring-actuated propelling mechanism.

With these objects in view the invention consists in certain novel features of construction and combinations and arrangements of parts, as hereinafter set forth, and pointed out in the claims.

In the accompanying drawings, Figure 1 is an elevation illustrating my invention. Fig. 2 is a plan view of the same. Figs. 3 and 4 are detail views.

A represents a car-truck, B B' the axles, and C the wheels. The truck-frame comprises in its structure two parallel bars $a\,a$, mounted between their ends on the axle B, the rear ends of said bars being bent outwardly and then rearwardly to produce arms $a'\,a'$, which at their rear ends are mounted on the rear axle B', and on said rear axle between the arms $a'$ a large gear-wheel 1 and a smaller gear-wheel 2 are loosely mounted and adapted to be locked to or unlocked from the axle by means of clutches $b\,b'$ respectively, and said clutches are operated by means of devices which will now be described.

A lever $q$ is pivotally supported between its ends and at one end is connected with a bar $q'$ bifurcated at both ends to receive the grooved clutch-collars $q^2\,q^2$. To the opposite end of the lever $q$ one end of a pitman $q^3$ is pivoted, the other end of said pitman being pivotally connected to a crank-arm $q^4$, carried by a vertical shaft or rod $q^5$, which latter may be mounted in the platform of the car. The shaft or rod $q^5$ also carries a pointer $q^6$, adapted to register with a plate $q^7$, on which the words "Ahead" and "Back," or similar words, are produced. The opposite end of the pointer $q^6$ will preferably be made in the form of a handle $q^8$, by means of which to operate the shaft or rod $q^5$.

From the construction and arrangement of parts above described it will be seen that when the handle is operated to turn the shaft $q^5$, so that the pointer will register with the word "Ahead" on the plate $q^7$, one of the clutches will be operated to connect the gearing with the axle, so that the car will be propelled ahead while the other clutch will be moved away from its corresponding gear. When the handle $q^8$ is moved so that the pointer will register with the word "Back" on the plate $q^7$ the clutches will be moved in the opposite direction and the car caused to run backward.

On the bars $a\,a$ of the truck-frame, at opposite sides of the axle B, shafts C C' are mounted. Each shaft C C' projects beyond its bearing on the truck-frame for the accommodation of drums D D and E E, respectively, the shaft C' also having a drum E' thereon between the bars $a\,a$ of the truck-frame. Each drum comprises two heads $c\,c'$, the head $c$ being made in the form of a gear-wheel, and these heads are connected together in a suitable manner. Between the heads $c\,c'$ of each drum two parallel bars $d\,d$ are supported, and between said bars one end of several series of springs G are secured by means of bolts $d'$, the other ends of said springs being secured to the respective shafts. The drums D E are of a width to accommodate four (more or less) series of springs and each series of springs comprises six flat springs placed one on the other and secured at their respective ends to the drum and shaft, as above explained. I prefer to make the drum E' of a width sufficient to accommodate a greater number of series of springs than the drums D E—say five series instead of four. The shafts C C' are provided, respectively, with sprocket-wheels $e$ $e'$, over which a sprocket-chain $e^2$ passes, whereby the motion of one shaft will be transmitted to the other.

On the shaft C a large gear-wheel 4 is secured and adapted to transmit motion to a small gear-wheel or pinion 5 carried by a shaft 6. A large gear-wheel 7 is secured to the shaft 6 and transmits motion to a small gear or pinion 8 carried by a shaft 9. The shaft 9 carries also a large gear-wheel 10 which transmits motion to a pinion 11 carried by a shaft 12, which latter carries a large gear-wheel 13 which transmits motion to a pinion 14 carried by a shaft 15. The shaft 15 also carries a large gear-wheel $15^a$ which transmits motion to a pinion $15^b$ carried by a shaft 16 mounted at its ends on the arms $a'$ of the truck-frame. At one end the shaft 16 carries a gear-wheel 17 adapted to mesh with the large gear-wheel 1 on the axle B'. On the other end of the shaft 16 is a small pinion 18 which meshes with a gear-wheel 19, the latter being of a size equal to that of the gear 2 on the axle B' and meshing with said wheel. From this construction and arrangement of parts it will be seen that when the gear-wheel 1 is locked to the axle B' by the clutch $b$ the axle and the car will be propelled in one direction, and that when the gear-wheel 1 is loose on the axle and the gear-wheel 2 locked thereto the axle and the car will be propelled in the opposite direction, owing to the intermediate gear-wheel 19.

The gearing above described is so proportioned that when the gear-wheel 4 makes one revolution per minute the rear axle B' will be revolved with sufficient speed to propel the car at the rate of twenty-four miles per hour. The springs of each series exert a force of six hundred pounds, each spring exerting a force of one hundred pounds. There being twenty-one series of these springs, the combined force of all the springs will equal twelve thousand six hundred pounds, which will be amply sufficient to perform all the work which will be required of them in propelling a street-car. In some cases it may be found that sufficient power can be had from two drums, each having several series of springs, in which case the drums E E' may be dispensed with.

Each shaft C C' is provided with a brake-wheel F, encircled by a brake-band F', and each brake-band is provided with lugs $f$ $f$ which are perforated for the accommodation of a vertical rod or shaft $f'$, one of said rods or shafts being, of course, provided for each brake-band. One of the lugs may be made with a plain perforation for the reception of the rod or shaft $f'$ and the other lug made with a screw-threaded perforation adapted to mesh with screw-threads on the rod or shaft, so that when the latter is turned in one direction the brake-band will be tightened on the brake-wheel. Each rod or shaft $f'$ is provided at its upper end with a bevel-pinion $f^2$ adapted to receive motion from similar pinions $f^3$ carried by a shaft $f^4$ running from end to end of the car. At each end of the shaft $f^4$ a bevel-pinion $f^5$ is secured, and each of these pinions $f^5$ is adapted to receive motion from a bevel-pinion $f^6$ secured to the lower end of a hollow shaft $g$ located on the platforms of the car. From this construction and arrangement of parts it will be seen that when either of the hollow shafts $g$ is turned in one direction the vertical rods or shafts $f'$ will be turned and the brake-bands F' applied to the brake-wheels F. The driving mechanism will thus be stopped and the motion of the car arrested. I prefer to mount a shaft $h$ in each hollow shaft $g$ and connect said shaft $h$ with the wheel-brakes, but such wheel-brakes are not absolutely necessary, as the brakes above described will, in most cases, be amply sufficient to stop the car.

To wind the springs, the devices now to be described will be employed.

A shaft $i$ is mounted in proximity to each series of drums, and each shaft $i$ is provided with a series of pinions $j$ adapted to mesh with the gear-wheels $c$ of the respective series of drums. Each shaft $i$ carries a worm-wheel $k$, to which motion is imparted by worms $l$ carried by worm-shafts $l'$. The upper ends of the worm-shafts are provided with bevel-pinions $m$ $m$, which receive motion from similar pinions $m'$ $m'$, carried by a shaft $n$. The shaft $n$ also carried a sprocket-wheel $o$ for the accommodation of a sprocket-chain $o'$, which also passes over a sprocket-wheel $p$ on the shaft of a one-half horse-power electric motor located on the car. This motor may be supplied with electrical energy from a suitable battery located under the seats, and suitable switches will be provided whereby to control the operation of the motor. From this construction and arrangement of parts it will be seen that the springs will be wound from the outside, or, in other words, by rotating the drums to which the outer ends of the springs are secured. The springs can, by energizing the electric motor, be wound at any time it may be desired.

My improvements are very simple in construction, are capable of supplying an adequate force to propel a loaded street-car or other vehicle, and are effectual in every respect in the performance of their functions.

Various slight changes might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. The combination with a car, truck and axle, of a spring motor carried by the truck and adapted to transmit motion to the axle, a brake wheel carried by the shaft of said motor, a brake band on said brake wheel, a rod or shaft connected with said brake band whereby to control its operation, a horizontal shaft, a pinion on the rod or shaft, a pinion on the horizontal shaft meshing with the pinion on the rod or shaft, pinions on the ends of said horizontal shaft, vertical hollow shafts on the platforms of the car, pinions carried by said vertical hollow shafts and meshing with the pinions on the ends of the horizontal shaft whereby the brake can be controlled from the platforms of the car, substantially as set forth.

2. The combination with a car truck and axle, of a shaft mounted on the truck, a drum, springs secured at their respective ends to said shaft and drum, gearing between the shaft and car axle, a gear wheel on said drum, a shaft in proximity to said gear wheel, a pinion on said shaft meshing with the gear wheel on the drum, a worm wheel carried by said last-mentioned shaft, a vertical shaft, a worm carried by the vertical shaft and meshing with said worm wheel, a pinion on said vertical shaft, a horizontal shaft carrying a pinion to mesh with the pinion on the vertical shaft, and a motor on the car constructed and adapted to transmit motion to said horizontal shaft whereby to wind said springs, substantially as set forth.

3. In a spring motor for a railroad car, the combination with a shaft, of a drum comprising two heads and a series of connecting rods, two bars located between said heads, and springs secured at one end between said bars and at their other ends to said shaft, substantially as set forth.

4. In a spring motor, the combination with a shaft, of a drum comprising two heads and connecting bars, two parallel bars between said heads, and several series of springs, each series comprising several springs one on the other, one end of each series of springs being secured between said parallel bars and the other ends of the several series of springs being secured to the axle, substantially as set forth.

5. The combination with a car, truck and axle, of a shaft, a drum, a gear wheel carried by said drum, several series of springs secured to the drum and shaft respectively, gearing for transmitting motion to said gear wheel whereby to turn the drum to wind the springs, and an electric motor on the car for transmitting motion to gearing, and multiplying gear between said shaft and the axle, substantially as set forth.

6. The combination with a car, axle and a motor geared with the axle so as to rotate said axle in either direction, of clutches on said axle for connecting the gearing therewith so as to cause the car to run in one direction or the other, a bar connected with both clutches, a pivoted lever connected to said bar, a pitman connected with said pivoted lever, a vertical shaft, a crank arm carried by said shaft and connected to the pitman, a pointer carried by said vertical shaft and a plate with which said pointer registers, said plate having matter thereon to indicate the direction in which the car will run when the pointer is turned in one direction or the other, substantially as set forth.

In testimony whereof I have signed this specification in the presence of two subscribing witnesses.

ROBERT H. CROSBY.

Witnesses:
KIMBALL S. MILLER,
I. M. MCCORMICK.